R. D. MOON.
WHEEL.
APPLICATION FILED OCT. 20, 1909.
971,463.
Patented Sept. 27, 1910.
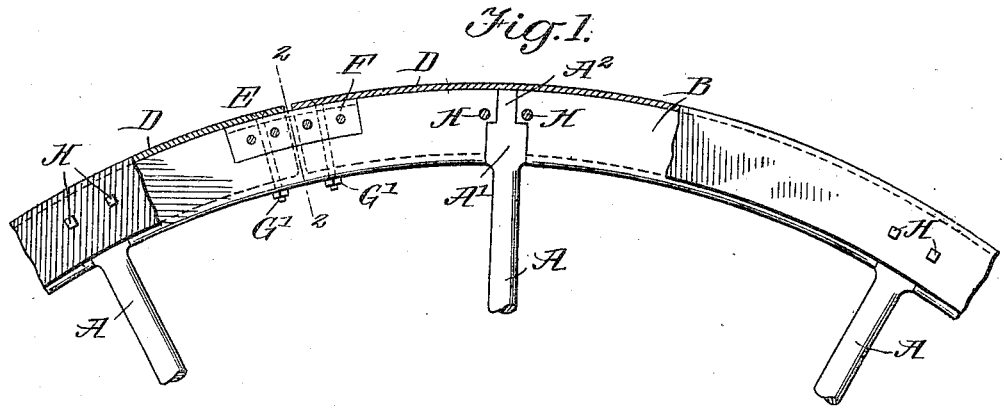
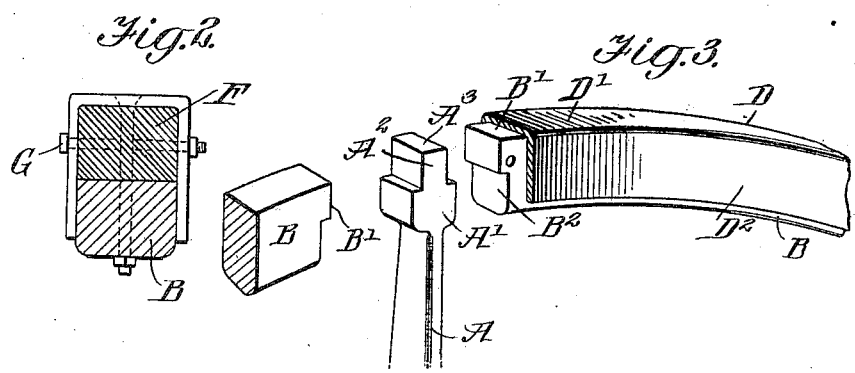
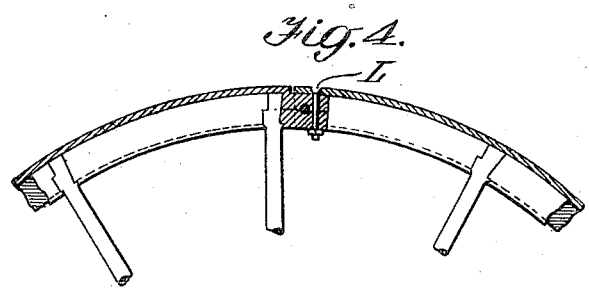
WITNESSES
Samuel E. Wade
Perry B. Turpin
INVENTOR
RICHARD D. MOON
BY
ATTORNEYS

UNITED STATES PATENT OFFICE.

RICHARD D. MOON, OF SAN ANGELO, TEXAS.

WHEEL.

971,463. Specification of Letters Patent. Patented Sept. 27, 1910.

Application filed October 20, 1909. Serial No. 523,570.

*To all whom it may concern:*

Be it known that I, RICHARD D. MOON, a citizen of the United States, and a resident of San Angelo, in the county of Tom Green and State of Texas, have made certain new and useful Improvements in Wheels, of which the following is a specification.

This invention is an improvement in wheels adapted for any of the ordinary purposes for which vehicle wheels are designed; and the invention consists in certain novel constructions and combinations of parts as will be hereinafter described and claimed.

In the drawing Figure 1 is a side view, partly broken in section, of a portion of a wheel embodying my invention. Fig. 2 is a cross section on about line 2—2 of Fig. 1. Fig. 3 is a detail perspective view with some of the parts detached, illustrating the connection between the felly sections and the spokes. Fig. 4 is a side view, partly in section, of a portion of a wheel showing a somewhat different construction from that presented in Fig. 1.

The spokes A may be used in connection with any ordinary hub and be united thereto in the usual or any other desired manner. At their outer ends the spokes A are provided with head-like constructions A', and with tenons $A^2$ at the outer ends thereof, the heads A' with their tenons $A^2$ fitting within the rim or between the sections thereof as shown in Figs. 1 and 4, and as more fully described hereinafter. As shown, the heads A' are of a width equal to the thickness of the felly sections B, and are flat on their opposite sides to coincide with the sides of the sections B, and the outer ends of the tenons $A^2$ coincide at $A^3$ with the outer surface B' of the rim sections B. The rim sections B fit each between their respective adjacent spokes A, and are notched in their ends at $B^2$ to fit the tenon heads A' of the spokes as best shown in Figs. 1, 3 and 4 of the drawing.

While the joints between the tenon heads of the spokes and the felly sections may be symmetrical and square as shown in Fig. 1, I may in some instances, desire to make the spoke heads and the coöperating ends of the felly sections of the particular form shown in Fig. 4, wherein the spoke heads and felly sections interlock.

The tire is made in sections and put on after the wheel is finished. Usually the sections are semicylindrical and the sections are securely fastened together at one end at E as shown in Fig. 1, and then thrown in a cold tire shrink, and made tight, and then riveted securely at E, as shown in Fig. 1.

In Figs. 1, 2 and 3, the tire sections D are shown channeled with the flat outer surfaces D' and the depending flat flanges $D^2$ which overlap the sides of the felly sections B and the heads of the spokes A, and these tire sections D are secured together at E by means of a bridge F, see Figs. 1 and 2, preferably in the form of an elongated block, seated in a recess formed in the outer side of the felly section B, and lapping the joint between the tire sections D, at E, and having transverse holes for the bolts G, and radial holes for the radially extending bolts G', whereby the base plate D' and the side flanges $D^2$ of the tire sections are rigidly united to the bridge connection F as will be understood from Figs. 1 and 2 of the drawing.

At or near their ends the felly sections B are provided with transverse openings adjacent the tenons $A^2$ of the spokes A for the passage of rivets or bolts H which secure the parts together as shown in Fig. 1 of the drawing. These rivets H may be arranged on both sides of the tenon $A^2$ as shown in Fig. 1, or they may be arranged on one side only of the said tenon as shown in Fig. 3 of the drawing.

In operation, when the tire gets loose it can be tightened by a cold tire shrink without taking the wheel apart and the tire cannot come off because of the flange construction shown in the several figures.

It is claimed that this wheel is superior to any other wheel in strength because of its construction in fellies, tire and spokes, where other wheels are weakest and first to give down. In this wheel there is no splitting of fellies, tire running off etc. The wheel can be more easily made, will be more durable and more easily repaired when repairs are necessary. The tire covering the sides of the felly and being riveted at the spokes will add the same strength to the rim of the wheel as the iron flanges add to the spokes in the patented hub.

As best shown in Figs. 1 and 3, it will be noticed that the joint between the felly sections and the headed form of spokes is such that while the felly sections abut both the head A' and the tenon $A^2$ of the spoke, they also abut the shoulders at the juncture of said parts, and the joint is formed between the felly and shoulders at the juncture of the tenon and head of the spoke at a point within the channeled tire. This is important inasmuch as by inclosing the abutment between the felly sections and the spoke head at the shoulder of the latter within the tire, I protect said joint and thereby increase the strength of the connection between the felly sections and the spoke by inclosing and maintaining the same within the channeled tire.

I claim—

The combination of a spoke having a head at its outer end, and a tenon and provided at the juncture of the tenon and head with shoulders, felly sections having their ends notched to conform to the shouldered end of the spoke and having said ends abutting partly against the head and partly against the tenon of the spoke and a channeled tire fitting over the joint between the felly sections and the head and extending inwardly to a point beyond the shoulders between the head and tenon whereby said shouldered joints between the felly sections and the spoke will be inclosed within and protected by the channeled tire, substantially as set forth.

RICHARD D. MOON.

Witnesses:
 JAS. W. HOWELL,
 WM. S. KELLY, Jr.